(12) United States Patent
Bodmer et al.

(10) Patent No.: US 6,544,926 B1
(45) Date of Patent: Apr. 8, 2003

(54) MICROCAPSULES HAVING IMPROVED PRINTING AND EFFICIENCY

(75) Inventors: Jerome Robert Bodmer, Appleton, WI (US); Chandrakant Bhailalbhai Patel, Neenah, WI (US); Troy Ronald Seehafer, Appleton, WI (US); Todd Arlin Schwantes, Lena, WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

(21) Appl. No.: 09/975,882

(22) Filed: Oct. 11, 2001

(51) Int. Cl.$^7$ .............................. B41M 5/20; B32B 9/00
(52) U.S. Cl. ...................... 503/215; 264/4.1; 264/4.32; 264/4.33; 264/4.4; 264/4.7; 264/5; 264/7; 428/402.21; 428/403; 427/372.2; 427/374.1; 430/109; 430/111; 503/218
(58) Field of Search .................... 264/4.1, 4.32, 264/4.33, 4.4, 4.7, 5, 7; 428/402.21, 403; 427/372.2, 374.1; 430/109, 111; 503/215, 218

(56) References Cited

U.S. PATENT DOCUMENTS

| | | | |
|---|---|---|---|
| 2,548,364 A | 4/1951 | Green et al. .................. 282/28 |
| 2,548,366 A | 4/1951 | Green et al. .................. 282/28 |
| 2,800,457 A | 7/1957 | Green et al. ................. 252/316 |
| 2,969,331 A | 1/1961 | Brynko et al. .............. 252/316 |
| 3,016,308 A | 1/1962 | Macaulay ................... 117/36.7 |
| 3,041,289 A | 6/1962 | Katchen et al. ............. 252/316 |
| 3,578,605 A | 5/1971 | Baxter ......................... 252/316 |
| 3,672,935 A | 6/1972 | Miller et al. ................ 117/36.8 |
| 4,001,140 A | * 1/1977 | Foris et al. ............. 427/213.34 |
| 4,087,376 A | * 5/1978 | Foris et al. ............. 427/213.34 |
| 4,089,802 A | * 5/1978 | Foris et al. ............. 427/213.34 |
| 4,100,103 A | * 7/1978 | Foris et al. ............. 427/213.34 |
| 4,330,473 A | 5/1982 | Hatano et al. ............... 549/226 |
| 4,525,520 A | * 6/1985 | Shioi et al. .................. 524/512 |
| 4,552,811 A | 11/1985 | Brown et al. ........... 428/402.21 |
| 5,164,126 A | 11/1992 | Kalishek et al. ............. 264/4.7 |
| 5,605,874 A | 2/1997 | Taylor et al. ................ 503/201 |
| 5,942,464 A | 8/1999 | Vaughn et al. .............. 503/200 |
| 5,962,134 A | 10/1999 | Shah et al. .................. 428/407 |
| 6,039,799 A | 3/2000 | Kawamura et al. ...... 106/287.2 |
| 6,042,641 A | 3/2000 | Justice .................... 106/31.16 |
| 6,103,662 A | 8/2000 | Sheiham ..................... 503/204 |

OTHER PUBLICATIONS

"Microencapsulation." James A. Herbig. Encyclopedia of Chemical Technology, vol. 13, Second Edition, pp. 436–456. John Wiley & Sons, Inc.: 1967.

"Dual wall microcapsules and its manufactural method." Possible Extract from Disclosure of Japanese Application No.: Sho 50–101074. Application date Aug. 20, 1975. George Marouf et al.

* cited by examiner

*Primary Examiner*—Samuel A. Acquah
(74) *Attorney, Agent, or Firm*—Wilhelm Law Service; Thomas D. Wilhelm (57) ABSTRACT

Dual shell microcapsule aggregate particles and copy materials coated therewith, such aggregate particles having inner shells surrounding chromogenic nucleus material, and outer shells encompassing multiple such inner shells to form aggregate particles thereof. The inner shells are derived from polar pre-polymer compositions. The outer shells are derived from complex colloids such as gelatin and gelatin derivatives. The outer shell material causes agglomeration of the inner shells into aggregate particles, thus increasing the sizes of the particles without increasing the sizes of the respective inner-shell microcapsules which contain the chromogenic material.

26 Claims, 2 Drawing Sheets

MICROCAPSULES HAVING IMPROVED PRINTING AND EFFICIENCY

FIELD OF THE INVENTION

This invention relates to the field of microcapsules having a nucleus material encased within a double shell material, where an inner shell comprises polymeric material and an outer shell comprises cross-linked complex colloid material, particularly formaldehyde capsules encased within gelatin, with glutaraldehyde having been used as a cross-linker for the gelatin. The invention also contemplates use of such microcapsules in printing processes, resulting in good printability and improved efficiency in the amount of microcapsule material used to obtain a specified level of print definition on paper stock.

BACKGROUND OF THE INVENTION

As used herein, a microcapsule is defined as having a diameter of about 1 micron to about 300 microns, preferably about 5–100 microns. Microcapsules have many applications, such as in manufacture of pharmaceuticals, pesticides, paints, adhesives, and many other chemical products. Microcapsules are especially useful where it is desired to provide controlled release of an enclosed and contained nucleus material, namely the substance being encapsulated. In one example of controlled release, the product known as "carbonless paper" is made by providing at least one component of a two-component colorant as the nucleus material in such microcapsules.

When the two components are mixed, such as when the encapsulated component is released from the capsule, the color-producing material is released and thus enabled to provide the desired coloration. In such carbonless paper, a layer of capsules of one or both components of a 2-component color-generating system may be coated onto a surface of paper or other fibrous web or sheet, or onto facing surfaces of facing sheets of paper or other fibrous web or sheet. When the capsules are broken, such as by pressure on the paper, the encapsulated colorant component is released, whereby the color-producing activity is enabled.

In one well known process, known by the term coacervation, the microcapsules can comprise an e.g. oil-containing nucleus material, and oil-impermeable shells formed of gelled complex polymerized materials. Principles of coacervation are taught by e.g. U.S. Pat. No. 2,800,457, and in the Kirk-Othmer Encyclopedia of Chemical Technology, Volume 13, John Wiley & Sons, 1967, Chapter on Microencapsulation, pages 436–456.

Coacervation comprises the phenomenon of phase separation in certain liquid polymer compositions leading to formation of two or more liquid phases, and deposition of polymerizable liquid shell material onto dispersed particles of liquid nucleus material. The cooperative formation of disperse particles, each having two such distinctly different liquid phases, distinguishes coacervation from precipitation of polymer solute in solid form in a liquid solvent. Coacervation can be activated by e.g. adjusting pH of the mixture. Both the gellable shell material and the nucleus material must be ionizable; and the combination of nucleus material and shell material must exist in the mixture, under certain conditions, with opposite ionic charges simultaneously existing on respective ones of the nucleus material and the shell material such that the respective particles of nucleus material and shell material are attracted to each other. Such opposite charges can be achieved by proper selection of the nucleus material and the shell material, and by adjusting pH or other physical property where one or both of the shell material and nucleus material are amphoteric, so as to effect polarity change. After the microcapsules are formed, the gelled or otherwise polymerized shell material can be hardened, optionally separated from the e.g. solvent liquid, dried, and if desired, comminuted to a desired particle size.

A liquid carrier such as oil can be used as the primary nucleus material, to carry one or more dispersed acting materials, either solid or liquid acting materials, including materials which can evaporate or degrade due to exposure to air. Additionally the carrier, itself, can be the material of interest in the nucleus, such as, for example, a perfume or marking fluid.

This invention relates to processes for en masse manufacturing of minute capsules, referred to herein as microcapsules, in a liquid manufacturing medium. The processes of the invention involve liquid-liquid phase separation of a relatively concentrated solution of polymeric material to be used in the formation of shells for the minute capsules. The processes of this invention involve, for example, the polymerization of urea and formaldehyde, monomeric or low molecular weight polymers of dimethylol urea or methylated dimethylol urea, melamine formaldehyde, monomeric or low molecular weight polymers of methylol melamine or methylated methylol melamine, in an aqueous vehicle wherein the reaction is conducted in the presence of certain acrylic acid-alkyl acrylate copolymers.

The sizes of microcapsules can suitably be chosen depending upon the expected end use. Where microcapsules are employed in e.g. pressure sensitive recording sheets, preferred microcapsule size is about 5 microns to about 30 microns in order to enable creating sharply defined images using the chromogenic nucleus material contained in such microcapsules. Where the microcapsules are to be coated onto a fibrous or otherwise porous sheet or web, such individual microcapsules may be so small as to become significantly recessed below the surface of the sheet or web, and accordingly cushioned from a crushing force directed toward the surface of such sheet or web. As a result, a normal activation pressure on the sheet or web is ineffective to rupture and thus activate, such individual microcapsules. Such recess of the microcapsule into the web or sheet can be overcome by employing relatively larger size microcapsules, but the resulting images created using such microcapsules exhibit relatively less clarity and sharpness of edge definition because of the larger size microcapsules. Yet a larger size particle is highly desirable in order to retain the particle at the surface of the sheet where such particle can more readily be broken by mechanical force applied at the surface of the sheet. Such larger size particle which can be retained at the surface of the sheet, while providing excellent image definition, is achieved in the invention by providing aggregates of the desirably small size microcapsules.

A method of encapsulation by in situ polymerization including a reaction between urea and formaldehyde or polycondensation of monomeric or low molecular weight polymers of dimethylol urea or methylated dimethylol urea in an aqueous vehicle conducted in the presence of negatively-charged, carboxyl-substituted linear aliphatic hydrocarbon polyelectrolyte material dissolved in the vehicle, is disclosed in U.S. Pat. Nos. 4,001,140; 4,087,376; and 4,089,802.

A method of encapsulating by in situ polymerization, including a reaction between melamine and formaldehyde or polycondensation of monomeric or low molecular weight polymers of methylol melamine or etherified methylol melamine in an aqueous vehicle conducted in the presence of negatively-charged, carboxyl-substituted, linear aliphatic hydrocarbon polyelectrolyte material dissolved in the vehicle, is disclosed in U.S. Pat. No. 4,100,103.

A method of encapsulating by polymerizing urea and formaldehyde in the presence of gum arabic is disclosed in U.S. Pat. No. 4,221,710. This patent further discloses that anionic high molecular weight electrolytes can also be employed with the gum arabic. Examples of the anionic high molecular weight electrolytes include acrylic acid copolymers and under specific examples of acrylic acid copolymers are listed copolymers of alkyl acrylates and acrylic acid including methyl acrylate-acrylic acid copolymers, ethyl acrylate-acrylic acid copolymers, butyl acrylate-acrylic acid copolymers and octyl acrylate-acrylic acid copolymers.

An exemplary method of preparing microcapsules by polymerizing urea and formaldehyde in the presence of an anionic polyelectrolyte and an ammonium salt of an acid is disclosed in U.S. Pat. Nos. 4,251,386 and 4,356,109. Examples of the anionic polyelectrolytes include copolymers of acrylic acid. Specific examples of acrylic acid copolymers are copolymers of alkyl acrylates and acrylic acid including methyl acrylate-acrylic acid, ethyl acrylate-acrylic acid, butyl acrylate-acrylic acid and octyl acrylate-acrylic acid copolymers.

The most widespread use of microcapsules to date has been in certain kinds of pressure-sensitive copying systems. In one such system, disclosed in U.S. Pat. No. 2,730,456 and commonly known as manifold record material, an upper sheet is coated on its lower surface with microcapsules containing a solution of a colorless chromogenic material (hereinafter referred to as a coated back sheet or CB sheet), and a lower sheet is coated on its upper surface with a color developing coreactant material, e.g. an acidic clay, a phenolic resin or certain organic salts (hereinafter referred to as a coated front of CF sheet). For implementations which require more than two plies in the record material, a number of intermediate sheets are also provided, each of which is coated on e.g. its lower surface with microcapsules and on its upper surface with acidic, color-developing material. Pressure exerted on the sheets by writing or typing ruptures the microcapsules, thereby releasing the chromogenic material solution onto the coreactant material on the next lower sheet and giving rise to a chemical reaction which develops the color of the chromogenic material.

In another system, known as a self-contained system and disclosed in U.S. Pat. Nos. 2,730,457 and 4,197,346, microcapsules containing a chromogenic material solution and a coreactant material are coated onto a surface of a sheet of paper in combination with a cooperating coating of a co-reactant material on the same sheet of paper. Pressure exerted on the sheet by writing or typing causes the capsules to rupture and release the chromogenic material, which then reacts with the coreactant material on the sheet to produce a color.

Microcapsules for use in the above-described pressure-sensitive copying systems must satisfy certain property requirements so as to produce a desirable copying system. Some of these properties are capsule strength, particle size, particle size distribution, and shell permeability.

The processes according to U.S. Pat. Nos. 4,001,140; 4,087,376; 4,089,802; and 4,100,103 have been successfully used to encapsulate liquid compositions of chromogenic materials for use in pressure-sensitive copying papers using certain materials as system modifiers to facilitate the encapsulation process. Of the carboxyl group system modifiers disclosed in the patents, hydrolyzed maleic anhydride copolymers are preferred. Among the hydrolyzed maleic anhydride copolymers, poly(ethylene-co-maleic anhydride) (hereinafter referred to as EMA) is typically preferred because of the balance of properties which EMA provides to the encapsulation processes and the resulting microcapsules.

The cost of EMA, relative to other eligible system modifiers is a premium, whereby the cost of microcapsules, manufactured by processes in which EMA constitutes the system modifier, is a premium cost. Because of cost and availability considerations, poly(acrylic acid) (hereinafter referred to as PAA), is an acceptable substitute for EMA as the system modifier. While microcapsules made using processes according to U.S. Pat. Nos. 4,001,140; 4,087,376; 4,089,802; and 4,100,103, in which PAA constitutes the system modifier, are of commercial quality for use in pressure-sensitive copying paper, such microcapsules do not possess an optimum balance of properties corresponding to the properties obtained when EMA is utilized.

One function of the system modifier in the patents is to take an active part in the control or moderation of the polymerization reaction of the starting materials used to form the condensation polymer which makes up the resulting capsule shells.

Another function of the system modifier in the patents is to act as an emulsifying agent to promote and maintain the separation of the individual droplets of the intended capsule nucleus material in the aqueous manufacturing vehicle.

When PAA is utilized as the system modifier, emulsification of the intended capsule nucleus material requires more energy input and time and produces a less desirable size distribution than when EMA is employed.

The less desirable emulsifying capability of PAA can be offset in the case of the process of U.S. Pat. No. 4,100,103 by mixing in, prior to emulsification, the starting materials (e.g. methylated methylol melamine) employed in the in situ polymerization reaction to form the condensation polymer which makes up the resulting capsule shells. The presence of methylated methylol melamine or a low molecular weight polymer thereof (hereinafter referred to as MMM) during the intended nucleus material emulsification step, can result in the premature polymerization of the MMM. The tendency of the MMM to prematurely react under these circumstances is reduced by raising the pH of the PAA-MMM solution to the highest level at which emulsification of the intended nucleus material can be obtained.

Once a satisfactory intended nucleus material emulsion is obtained, the pH of the emulsion is reduced in order to obtain the deposition of satisfactory capsule shell material about the nucleus material particles in a reasonable amount of time. This process is further modified by the addition of certain salts as disclosed in U.S. Pat. No. 4,444,699 of Donald E. Hayford. PAA can also be used as the system modifier optionally in combination with polystyrene sulfonic acid or a salt thereof in which the polystyrene sulfonic acid is present.

While the coacervation process has many advantages, some disadvantages are associated with conventional coacervation processes. For example, it can be difficult to achieve a high level of control of the sizes and size distribution or size range within a population of the microcapsules. Inadequate and/or inconsistent agitation of the mixture can produce capsules which are larger than a maximum desired size suitable for the contemplated application. Such larger capsules produce color indications of undesirably reduced definition and clarity.

The particle size of microcapsules required for good clarity and definition of a color developed image can be necessarily so small that such particles become embedded in the e.g. paper sheet onto which such microcapsules are coated, such that the structure of the paper sheet cushions the microcapsules from applied mechanical force intended to fracture the microcapsules and thus release the nucleus material.

Conventional liquid-phase methods of making capsules, such as the coacervation process, can produce acceptable quality encapsulated product in a limited number of combinations of shell material and nucleus material without deleterious affect of the nucleus material on the shell material so as to result in an undesirably high level of permeation of the nucleus material through the shell material.

Another disadvantage of microcapsules made using conventional coacervation processes is that the nucleus material, or combination of nucleus materials, can chemically attack the shell material over time, thereby negating the value of such microcapsules.

It is an object of the present invention to provide improved microcapsules having dual shells, wherein the inner shell is a polymer material, preferably a polymer polymerized from polar precursor materials, such as various of the formaldehyde or other aldehyde-derived polymers, for example a melamine-formaldehyde or derivative, or a urea formaldehyde or derivative, and the outer shell is a combination of a polymerized or otherwise coalesced and consolidated solid material, preferably gelatin or other complex colloid, along with use of a suitable cross-linking material, such as an aldehyde, preferably glutaraldehyde.

It is an object of the present invention to provide microcapsule aggregates having dual shells, wherein the inner shell about each nucleus is a polymer material, preferably a polymer polymerized from polar pre-polymer materials, and the outer shell is a combination of a polymerized or otherwise coalesced and consolidated solid material, preferably gelatin, along with use of a suitable cross-linking material, such as an aldehyde, preferably glutaraldehyde.

It is a more specific object of the invention to provide such microcapsules in a given population preferably having an average size correlating to a spherical diameter of about 5 microns to about 50 microns, and a narrow size distribution range having a standard deviation of up to about plus or minus 25 percent.

It is a further object to provide such double shell microcapsules in aggregate form wherein a population of such aggregates has an average particle size correlating to a spherical diameter of about 15 microns to about 200 microns, with a narrow size distribution range having a standard deviation of up to about plus or minus 25 percent.

Another object of the invention is to provide paper stock having equivalent or relatively improved printability characteristics relative to sizes of the individual discrete particles while utilizing a relatively reduced loading of such microcapsules or microcapsule aggregates of the present invention.

A further object of the invention is to provide methods for manufacturing dual shell microcapsules having a desired size and a narrow size distribution range, where the inner shell is a polymer material derived from a carboxylic monomer, preferably an aldehyde-derived resin, and the outer shell is a polymerized and consolidated, e.g. cross-linked, gelatin, preferably cross-linked with an aldehyde, more preferably cross-linked with glutaraldehyde.

It is yet another object of this invention to provide a process for loading a paper stock by loading such paper stock with a reduced mass of nucleus material, e.g. dye or dye precursor material in microencapsulated form while retaining equivalent or improved activation properties of the encapsulated nucleus material, e.g. printability characteristics, including sharpness of image definition, to the paper stock.

SUMMARY OF THE DISCLOSURE

The present invention provides improved microcapsules and microcapsule aggregates, and processes for making such microcapsules and microcapsule aggregates. The invention further provides methods for more efficiently utilizing microcapsules in paper stock while retaining desired e.g. printing properties, wherein the paper stock has acceptable e.g. sharpness of image printing qualities in combination with a reduced microcapsule loading.

The processes of the invention involve deposition of gelatin or a gelatin derivative or other complex colloid, about a previously-formed microcapsule, for example having a single layer or multiple layer shell, including about a previously-formed capsule shell. In the alternative, the processes of the invention involve formation and polymerization of a first inner capsule shell about a droplet of nucleus material with formation and polymerization of a second outer capsule shell, outwardly of and deposited about the inner capsule shell, either in partial combination with formation of the inner shell or shortly after formation of the inner shell and optionally under processing conditions similar to the conditions which resulted in formation of the inner shell.

The processes of the invention involve controlled agglomeration of the capsules into coalesced, controlled-size aggregates having inner and outer shells wherein the outer shell material serves as an outer skin on such aggregates.

To overcome the problems outlined above, novel microcapsules and microcapsule aggregates have been developed in this invention, each microcapsule having a nucleus material, each microcapsule having an internal shell of solid-phase polymerized polymer material and each microcapsule, or aggregate of microcapsules, having an external shell of gelled gelatin, gelatin derivative, or other complex colloid.

The internal and external shells of a respective microcapsule or microcapsule aggregate are adherent in combination and in general to each other to form a two-layer shell around the nucleus material. The inner shell surrounds the nucleus material. The outer shell generally surrounds the inner shell.

Where multiple microcapsules form respective aggregate particles, the outer shell material surrounds the individual inner shells and the respective microcapsules in a given aggregate particle collectively adhere to each other.

In the alternative, an individual microcapsule can be thought of as comprising the nucleus material and an inner shell, with the inner shells of adjacent ones of such microcapsules touching each other or being in closely-spaced proximity with each other, and wherein a collection of such individual microcapsules being encompassed by and/or surrounded by a skin of the outer shell material. In such case, the inner shells of the respective microcapsules can be touching each other, or can be spaced in close proximity with each other with a relatively thinner layer of outer shell material disposed between outer surfaces of the inner shells of adjacent ones of the microcapsules. Such consideration of relatively thinner layers of outer shell material between the inner shells of adjacent microcapsules is addressed at the loci of closest approach of the respective adjacent microcapsules, and is compared to an average thickness of the outer shell material on the outside surface of the aggregate particle where the outer shell material is underlain by an inner shell of a microcapsule at the surface of the aggregate. In this regard, shell thickness is defined along a line extending perpendicular to the outer surface of the inner shell material, and through a central locus, e.g. center, of the microcapsule.

In view of the opportunity to select two different shell materials for the shells, each shell material can provide less than all properties required of the shell. Accordingly, such double shell structure can be stronger, less permeable to the nucleus material, and more resistant to chemical attack while employing a wider range of shell materials than can be employed in single-shell microcapsules. Such double shell structure can thus offer two shell material selections, instead of just one, to more assuredly physically and chemically contain the nucleus material, and to control strength, shell thickness, capsule or capsule aggregate size, capsule or capsule aggregate durability, and the like.

Accordingly, the invention comprehends a population of pressure sensitive microcapsule aggregate particles. Respective aggregate particles in the population comprise a plurality of inner shells polymerized from polar pre-polymer materials, the inner shells extending about, and defining, closed central chambers, said inner shells being disposed in close proximity to each other in a given aggregate particle in an arrangement of said inner shells. Each of the closed central chambers contains liquid chromogenic composition. Outer shell material defines an outer shell collectively enveloping the plurality of inner shells in a given aggregate particle and thereby collectively joining the inner shells together as the aggregate particle.

In some embodiments, the outer shell material is selected from the group consisting of gelatin, gelatin derivatives, and other complex colloids capable of forming the outer shell.

In some embodiments, the outer shell material surrounds substantially the entirety of each inner shell.

The outer shell preferably comprises cross-linked gelatin and/or gum arabic, and the inner shell preferably comprises an aldehyde derivative.

The aggregate particles preferably have effective diameters of about 20 microns to about 35 microns.

The outer shell material preferably comprises about 2 weight percent to about 10 weight percent, more preferably about 3 weight percent to about 8 weight percent of the composition of said aggregate particles.

Another aspect of the invention comprises pressure sensitive copying material wherein such pressure sensitive copying material comprises a substrate fibrous sheet material for receiving a coating of marking material, and a marking material coated on and affixed to the substrate fibrous sheet material. The marking material comprises pressure-sensitive microcapsule aggregate particles. Each aggregate particle contains a liquid chromogenic composition enclosed in a plurality of inner shells polymerized from polar pre-polymer materials. Each inner shell extends about and encloses a droplet of the liquid chromogenic composition. The inner shells are disposed in close proximity to each other in an array of the inner shells. An outer shell collectively encompasses the inner shells thus to define an outer surface of the respective aggregate particle.

The invention further comprehends a method of making aggregate particles containing droplets of chromogenic material wherein a respective aggregate particle comprises multiple droplets of such chromogenic material, each contained in a microcapsule defined by an inner shell. An outer shell encompasses the entirety of the aggregate particle and thereby collectively contains the enclosed inner shells and droplets. The method comprises forming microcapsules from polar pre-polymer materials in an aqueous processing mixture, each microcapsule comprising an inner shell and a droplet of chromogenic material contained therein. The method further includes, after formation of the inner shell, adding an outer shell material comprising gelatin to the reaction mixture and thereby agglomerating the inner shells into aggregate particles wherein gelatin forms an outer shell coating encompassing each respective aggregate particle.

The method can include adding the gelatin in a quantity of about 2 weight percent to about 10 weight percent of the quantity of the combination of the gelatin, the inner shells, and the droplets of chromogenic material.

The method preferably includes forming the inner shells using a composition rich in aldehyde.

Preferred embodiments of the method include mixing the mixture and treating the mixture with an agglomeration control agent so as to obtain aggregates having average effective diameters of about 20 microns to about 35 microns.

The invention also comprehends a method of making aggregate particles containing droplets of chromogenic material wherein a respective aggregate particle comprises multiple droplets of such chromogenic material, each contained in a microcapsule defined by an inner shell. An outer shell encompasses the entirety of the aggregate particle and thereby collectively encompasses the enclosed inner shells and droplets.

The method comprises initiating formation of the microcapsules from polar pre-polymer material, in an aqueous processing mixture such that initiation of each such microcapsule initiates development of an inner shell about a droplet of the chromogenic material; and after initiating formation of the microcapsules, and before reaching an end point of such development of the microcapsules, adding to the aqueous mixture an outer shell material which deposits on the inner shells thus attenuating deposition of inner shell material from the liquid mixture onto the developing inner shells, and wherein the outer shell material agglomerates the developing microcapsules together and forms aggregate particles thereof and forms an outer shell coating encompassing each respective aggregate particle.

The invention is not limited in its application to the details of construction or the arrangement of the components set forth in this description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals, where used, are used to indicate like components.

DESCRIPTION OF THE ILLUSTRATED EMBODIMENTS

The terms "capsules" and microcapsules" as used in this teaching refer to capsules which are less than 300 microns in size, preferably about 5 microns to about 100 microns in size, and more preferably about 5 microns to about 50 microns in size.

The polymeric inner shell of the microcapsule can comprise any polymeric material conventionally known and used for forming microcapsules, so long as the polymeric material is physically and chemically compatible with the nucleus material, and so long as the polymeric material is susceptible of being encapsulated by the outer shell material utilized to form the outer shell of the microcapsule. Preferred material for the inner shell comprises a polar material preferably derived from polar pre-polymer materials containing carboxyl groups such as aldehydes and carboxylic acids. The polymer material of the outer shell is preferably gelatin or a gelatin derivative and is operable to encapsulate the material utilized to form the inner shell of the microcapsule. In some implementations, other materials commonly used with gelatin can be used so long as the desired gelatin properties are obtained. Thus, for example, the composition of the outer shell material can include a fraction of gum arabic.

Cross-linking material, where used to cross-link either the inner shell material or the outer shell material, can comprise any cross-linking material conventionally known for use for cross-linking the respective shell material when used to form shells of microcapsules. Preferably, such cross-linking material is an aldehyde, more preferably glutaraldehyde or a glutaraldehyde derivative.

The nucleus material can be any known nucleus material or nucleus material combination. The nucleus material can be for example, a solvent and a desired solute material dissolved therein. Dual shell microcapsules enable the use of, for example, nucleus material which normally cannot be utilized in a single polymeric shell microcapsule, for example due to permeation problems, chemical reactivity of the shell material with nucleus material, or physicochemical activity of the shell material with the nucleus material.

Surprisingly the use of dual shell microcapsules provides equivalent or improved printability of certain colorants and colorant precursors at reduced rates of loading of the microcapsules in certain pressure sensitive copying material such as paper stock sheets.

Such pressure sensitive copying material can be any pressure sensitive copying material generally known in the art which is coated or impregnated with microcapsules, for the purpose of applying mechanical force to certain areas of such coated copying material to thereby break the microcapsules in that area and thereby release the contained nucleus material.

Capsules comprising the inner shell material and used in the examples below can be prepared in any manner known in the art. One such manner is described in U.S. Pat. No. 4,552,811, herein incorporated by reference in its entirety, and is described in some detail following.

According to the '811 patent, the reaction which forms the inner shell comprises polymerization of e.g. urea and formaldehyde, or monomeric or low molecular weight polymers of dimethylol urea or methylated dimethylol urea, or melamine, and formaldehyde, or monomeric or low molecular weight polymers of methylol melamine or methylated methylol melamine, in an aqueous carrier liquid. The reaction is conducted in the presence of certain acrylic acid-alkyl acrylate copolymers, with the weight percent and type selected from the group consisting of about 12 weight percent to about 30 weight percent ethyl acrylate, about 6 weight percent to about 14 weight percent propyl acrylate, about 4 weight percent to about 20 weight percent butyl acrylate, about 2 weight percent to about 14 weight percent amyl acrylate, about 2 weight percent to about 10 weight percent hexyl acrylate, about 4 weight percent to about 12 weight percent cyclohexyl acrylate and about 2 weight percent to about 30 weight percent 2-ethylhexyl acrylate.

When the processes of U.S. Pat. Nos. 4,001,140; 4,087,376; 4,089,802; and 4,100,103 are practiced using certain acrylic acid-alkyl acrylate copolymers, certain benefits are produced. Improved emulsification of intended capsule nucleus material, substantially enhanced resistance of the emulsion to destabilization during the course of subsequent encapsulation processes, enhanced resistance to frictional smudge damage, and enhanced impermeability of the resulting microcapsule shells, are included among the benefits when compared to the results obtained from the use of PAA or a non-preferred copolymer.

Use of acrylic acid-alkyl acrylate copolymers provides an emulsion of intended capsule nucleus material of improved drop size distribution.

Use of acrylic acid-alkyl acrylate copolymers also provides an emulsion of intended capsule nucleus material having improved resistance to destabilization during the course of an encapsulation process.

Use of acrylic acid-alkyl acrylates further provides microcapsules which possess improved resistance to frictional smudge damage.

Use of acrylic acid-alkyl acrylates yet further provides shells of the resulting microcapsules which possess improved impermeability of the nucleus material through the shell material.

Such acrylic acid-alkyl acrylate processes can be used to produce microcapsules wherein the capsule shell material comprises e.g. urea-formaldehyde polymeric material or melamine-formaldehyde polymeric material, in either case generated by in situ polymerization reaction in the presence of certain acrylic acid-alkyl acrylate copolymers dissolved in the manufacturing liquid carrier.

Starting materials used to form the condensation polymer which makes up the resulting capsule shells and the procedures described in U.S. Pat. Nos. 4,001,140; 4,087,376; 4,089,802; and 4,100,103, which are hereby incorporated by reference, are eligible for use in such acrylic acid-alkyl acrylate process in this invention.

In addition to the materials and procedures described in the above-referenced patents, as taught in U.S. Pat. No. 4,552,811 Brown et al, herein incorporated by reference in its entirety, the acrylic acid-alkyl acrylate process involves use of certain acrylic acid-alkyl acrylate copolymers as the system modifier. Exemplary of such system modifiers are the copolymers of acrylic acid and ethyl acrylate, propyl acrylate, butyl acrylate, amyl acrylate, hexyl acrylate, cyclohexyl acrylate, and 2-ethylhexyl acrylate, respectively. Also exemplary of such system modifiers are copolymers of acrylic acid and mixtures of alkyl acrylates. More specifically, the copolymers of acrylic acid and the above-identified alkyl acrylates, which produce the aforementioned beneficial properties, are those copolymers in which the proportion of alkyl acrylate in the copolymer is represented by the weight percent of the copolymer listed in Table 1.

In order to determine the preferred amount of alkyl acrylate in the copolymers, one or more of the following selection methods are employed:

(1) ease of preparing an emulsion of intended capsule nucleus material of acceptable drop size distribution;
(2) resistance of the emulsion to destabilization during addition of the starting materials for capsule shell formation;
(3) resistance of the emulsion to destabilization during the course of carrying out the encapsulation process; and
(4) impermeability of the resulting microcapsules.

TABLE 1

| Alkyl Acrylate | Weight Percent of Alkyl Acrylate in Copolymer |
| --- | --- |
| ethyl acrylate | about 12 to about 30 |
| propyl acrylate | about 6 to about 14 |
| butyl acrylate | about 4 to about 20 |
| amyl acrylate | about 2 to about 14 |
| hexyl acrylate | about 2 to about 10 |
| cyclohexyl acrylate | about 4 to about 12 |
| 2-ethylhexyl acrylate | about 2 |

The encapsulation processes employing acrylic-acid-alkyl acrylate are operable over a wide range of temperatures but a temperature range of about 40 degrees C. to about 95 degrees C. is preferred. More preferred is the temperature range of about 50 degrees C. to about 70 degrees C.

Under certain circumstances the inclusion of one of the salts disclosed in U.S. Pat. No. 4,444,699 provides further improvement in the viscosity of the resulting microcapsule slurry. However, use of such salts is not required to practice and demonstrate the beneficial properties of the acrylic acid-alkyl acrylate process.

The following examples are given as illustrative of acrylic acid-alkyl acrylate process and are not to be considered as limiting. All parts and percentages throughout the description of the acrylic acid-alkyl acrylate process are by weight, unless specified otherwise. All solutions, unless otherwise designated, are aqueous solutions.

The intended capsule nucleus material for all of the examples to follow is a solution of chromogenic compounds as listed in Table 2.

TABLE 2

| Concentration | Chromogenic Material |
| --- | --- |
| 1.70% | 3,3-bis(p-dimethylaminophenyl)-6-dimethylaminophthalide |
| 0.55% | 2'-anilino-3'-methyl-6'-diethylaminofluoran |
| 0.55% | 3,3-bis(1-ethyl-2-methylindol-3-yl)phthalide |

The solvent for the preceding chromogenic compound solution is a mixture of 65 parts by weight of a $C_{10}$–$C_{13}$ alkylbenzene and 35 parts of benzylated xylenes (U.S. Pat. No. 4,130,299).

Each of the following Examples 1–57 are drawn from U.S. Pat. No. 4,552,811 and are exemplary of microcapsules which can be formed and/or agglomerated into aggregate particles of this invention wherein a respective aggregate particle comprises a plurality of microcapsules. Each such microcapsule has a core of nucleus material surrounded by an inner shell material. The collective plurality of microcapsules is encapsulated in a skin of outer shell material. Optional quantities of outer shell material can be disposed in the interstices of the aggregate between respective ones of the plurality of microcapsules, thus filling such interstices and adjoining the surfaces of adjacent ones of the inner shells to each other.

EXAMPLES 1–51

The following general procedure was used in an acrylic acid-alkyl acrylate process for Examples 1–51 to produce microcapsules sometimes referred to hereinafter as "aminoplast" microcapsules. Such aminoplast microcapsules can be, for example, the starting material for making the novel microcapsules and microcapsule aggregates of this invention.

Into 153 grams of a mixture of 149.5 grams of water and 3.5 grams of the acrylic acid-alkyl acrylate copolymer, adjusted to pH 5.0, were emulsified 180 grams of the intended capsule nucleus material solution of Table 2. A second mixture of 6.5 grams of the corresponding acrylic acid-alkyl acrylate copolymer and 65 grams of water was prepared and adjusted to pH 5.0 and 20 grams of a partially methylated methylol melamine resin solution ("Resimene 714", 80 percent solids, Monsanto Company, St. Louis, Mo.) was added and this mixture was in turn added with stirring to the above-described emulsion. The resulting mixture was placed in a container which was mounted in a room temperature water bath. Continuous stirring was provided and the bath was heated to 55 degrees C. and maintained at this temperature, with continuous stirring, overnight to initiate and complete encapsulation.

The above procedure was used for all Examples employing the polymerization of methylated methylol melamine resin as the capsule shell forming process with the following exceptions.

When ethyl acrylate-acrylic acid was the copolymer, the pH of the second mixture was adjusted to 4.0 rather than 5.0. When propyl acrylate-acrylic acid, amyl acrylate-acrylic acid, cyclohexyl acrylate-acrylic acid and 2-ethyl hexyl acrylate-acrylic acid were the copolymers, all ingredients were utilized at half the quantities specified in the general procedure and the water bath was heated to a temperature of 65 degrees C. rather than 55 degrees C.

For each of the above Examples, the particle size was measured after emulsification, after addition of the mixture of the Resimene and additional copolymer and after completion of the encapsulation process. The particle size measurements were made both in a Microtrac Particle Size Analyzer (manufactured by Leeds and Northrop Instruments, St. Petersburg, Fla.) and visually by means of a microscope. Both means were employed because, even though the Particle Size Analyzer is very good at providing reliable particle size data for small sizes, it can fail to detect very large droplets which can be easily detected by means of a microscope.

A CF draw-down test, similar to that in U.S. Pat. No. 4,100,103, was employed to follow the course of the shell formation and to detect the presence of over-sized capsules. In the present Examples, the encapsulation emulsion containing all of the capsule-forming ingredients was coated onto a reactive CG sheet utilizing a gap-type applicator set at 75 microns wet film thickness. In this test, a color is formed by the reaction of the chromogenic material with the co-reactant material of the CF sheet. Capsule shell formation is demonstrated by the mitigation of the color when the emulsion is coated at a later time and is measured by an opacimeter to give the reflectance of the coated area. This same test provides a means of detecting over-sized capsules which appear as blue specks, visible to the naked eye, upon drying of the emulsion.

Listed in Table 3 are Examples 1–51 and the corresponding type of acrylic acid-alkyl acrylate copolymer and weight percent of the respective alkyl acrylate in the copolymer.

dried. The resulting CB sheets were each tested in a Typewriter Intensity (TI) test and Oven Decline test as described below.

For the TI test, a CF sheet bearing a coating comprising an oil-soluble metal salt of a phenol-formaldehyde novolak resin, made by procedures described in U.S. Pat. Nos. 3,732,1,20 and 3,455,721, was employed. In the TI test a standard pattern is typed on a coated-side-to-coated-side CB-CF pair. After the image develops twenty minutes, the intensity is measured by a reflectance method. The reflec-

TABLE 3

| | Alkyl Group in Copolymer | | | | | | |
|---|---|---|---|---|---|---|---|
| | Ethyl | Propyl | Butyl | Amyl | Hexyl | Cyclohexyl | 2-Ethylhexyl |
| Example | Ex. 1, 10% | Ex. 10, 5% | Ex. 17, 2% | Ex. 27, 1% | Ex. 36, 1% | Ex. 43, 2% | Ex. 49, 1% |
| Number | Ex. 2, 12% | Ex. 11, 6% | Ex. 18, 4% | Ex. 28, 2% | Ex. 37, 2% | Ex. 44, 4% | Ex. 50, 2% |
| and | Ex. 3, 14% | Ex. 12, 8% | Ex. 19, 6% | Ex. 29, 4% | Ex. 38, 4% | Ex. 45, 6% | Ex. 51, 3% |
| Corresponding | Ex. 4, 18% | Ex. 13, 10% | Ex. 20, 8% | Ex. 30, 6% | Ex. 39, 6% | Ex. 46, 8% | |
| Weight | Ex. 5, 22% | Ex. 14, 12% | Ex. 21, 10% | Ex. 31, 8% | Ex. 47, 12% | Ex. 47, 12% | |
| Percent | Ex. 6, 24% | Ex. 15, 14% | Ex. 22, 12% | Ex. 32, 10% | Ex. 41, 10% | Ex. 48, 16% | |
| Alkyl | Ex. 7, 26% | Ex. 16, 16% | Ex. 23, 14% | Ex. 33, 12% | Ex. 42, 12% | | |
| Group | Ex. 8, 30% | | Ex. 24, 16% | Ex. 34, 14% | | | |
| In | Ex. 9, 35% | | Ex. 25, 20% | Ex. 35, 18% | | | |
| Copolymer | | | Ex. 26, 24% | | | | |

In Table 4 are listed the performance results of Examples 1–51 as determined by the previously-described particle size measurements and CF draw-down test. From these results, the critical range for each copolymer can be determined.

tance of the typed area is a measure of color development on the CF sheet and is reported as the ratio of the reflectance of the typed area to that of the background reflectance of the CF paper (I/Io), expressed as a percentage. A high value indi-

TABLE 4

| | Percent by Weight of Alkyl Acrylate in Copolymer | | | | | | | | | | | | | | | |
|---|---|---|---|---|---|---|---|---|---|---|---|---|---|---|---|---|
| | 1 | 2 | 3 | 4 | 5 | 7 | 10 | 12 | 14 | 16 | 18 | 20 | 22 | 24 | 26 | 30 | 35 |
| Ethyl Acrylate | | | | | # | + | + | | + | | + | + | + | + | 0 | | |
| Propyl Acrylate | | 0 | | \| | + | + | + | + | + | \| | | | | | | |
| Butyl Acrylate | | * | + | | + | + | + | + | + | + | | + | | 0 | | | |
| Amyl Acrylate | \| | + | + | | + | + | + | + | + | | * | | | | | | |
| Hexyl Acrylate | | + | + | | + | + | + | * | | | | | | | | | |
| Cyclohexyl Acrylate | | * | + | | + | + | | + | | * | | | | | | | |
| 2-Ethylhexyl Acrylate | * | + | * | | | | | | | | | | | | | | |

Key:
0-Unacceptable emulsion.
|-Acceptable emulsion, but unacceptable size change when Resimene solution added.
*-Acceptable emulsion, but unacceptable size change during encapsulation.
-Acceptable emulsion, but unacceptable encapsulation due to poor wall formation.
+-Acceptable emulsion and acceptable encapsulation.

Certain ones of Examples 1–51 were individually mixed with ethoxylated corn starch binder and uncooked wheat starch granules according to the dry proportions listed below and sufficient water was added to make a 20 percent solids dispersion.

| Parts, Dry | Material |
|---|---|
| 50 | capsules |
| 5 | ethoxylated corn starch |
| 12.5 | wheat starch granules |

The dispersion was coated onto a 50 grams per square meter paper base with a No 2 wire-wound coating rod and cates little color development and a low value indicates good color development.

A related test concerning capsule quality is the degree of loss of ability of capsule-coated paper to produce transfer prints in a typewriter test after storage of the coated paper in an oven at a specified temperature for a specified time (Oven Decline Test). Such Oven Decline Test correlates to permeability of the nucleus material through the microcapsule shell.

It is useful to perform a TI test with a CB/CF couplet, placing the CB in a 100 degree C. oven for 16 hours and then re-imaging the couplet after storage. Such couplet test has consistently shown that capsules of undesirable quality lose most or all of their ability to make a transfer print after such Oven Decline Test and that good capsules withstand the Oven Decline Test with little or no loss in ability to produce a print.

As evidenced by the data in Table 5, all of the CB sheets tested demonstrate good capsule quality through the retention of the ability of the CB sheets to produce a good TI image intensity after the Oven Decline Test.

TABLE 5

| | Alkyl Group of Copolymer | | Typewriter Intensity | |
|---|---|---|---|---|
| Ex. No. | Weight Percent | Type | Before Oven Storage | After Oven Storage |
| 3 | 14 | Ethyl | 53 | 55 |
| 6 | 24 | Ethyl | 53 | 54 |
| 11 | 6 | Propyl | 53 | 55 |
| 12 | 8 | Propyl | 53 | 57 |
| 13 | 10 | Propyl | 53 | 55 |
| 14 | 12 | Propyl | 54 | 56 |
| 15 | 14 | Propyl | 54 | 55 |
| 19 | 6 | Butyl | 51 | 56 |
| 20 | 8 | Butyl | 46 | 50 |
| 21 | 10 | Butyl | 52 | 55 |
| 22 | 12 | Butyl | 50 | 54 |
| 28 | 2 | Amyl | 53 | 55 |
| 29 | 4 | Amyl | 56 | 58 |
| 30 | 6 | Amyl | 57 | 59 |
| 31 | 8 | Amyl | 55 | 58 |
| 32 | 10 | Amyl | 54 | 56 |
| 33 | 12 | Amyl | 60 | 64 |
| 34 | 14 | Amyl | 53 | 56 |
| 37 | 2 | Hexyl | 56 | 59 |
| 38 | 4 | Hexyl | 55 | 58 |
| 39 | 6 | Hexyl | 55 | 56 |
| 40 | 8 | Hexyl | 55 | 58 |
| 41 | 10 | Hexyl | 56 | 59 |
| 44 | 4 | Cyclohexyl | 54 | 56 |
| 45 | 6 | Cyclohexyl | 54 | 56 |
| 46 | 8 | Cyclohexyl | 53 | 57 |
| 50 | 2 | 2-Ethylhexyl | 53 | 56 |

EXAMPLES 52–57

In Examples 52–57, a series of encapsulation experiments, similar to Examples 1–51, was performed except that a different capsule shell formation process was utilized. In each of Examples 52–57, the following general procedure was used. Into a mixture of 89.5 grams of water, 5 grams of urea, 0.5 gram of resorcinol and 5 grams of an alkyl acrylate-acrylic acid copolymer, adjusted to pH 4.0, were mixed 90 grams of the intended capsule nucleus material solution of Table 2. Such mixtures were emulsified and each such resulting mixture/emulsion was placed in a container which was mounted in a room temperature water bath. Continuous stirring was provided, 13.5 grams of 37 percent formaldehyde solution were added and the bath was heated to 55 degrees C. and maintained at that temperature overnight to initiate and complete encapsulation.

The resulting capsule compositions had acceptable particle sizes and particle size distributions, and were formulated into CB sheets as previously described and such CB sheets were utilized in Typewriter Intensity and Oven Decline tests as previously described. The results of the TI and Oven Decline tests are shown in Table 6.

TABLE 6

| | Alkyl Group of Copolymer | | Typewriter Intensity | |
|---|---|---|---|---|
| Ex. No. | Weight Percent | Type | Before Oven Storage | After Oven Storage |
| 52 | 18 | Ethyl | 56 | 56 |
| 53 | 8 | Propyl | 59 | 59 |
| 54 | 6 | Hexyl | 54 | 54 |
| 56 | 4 | Cyclohexyl | 56 | 56 |
| 57 | 2 | 2-Ethylhexyl | 55 | 56 |

The results of the Typewriter Intensity and Oven Storage tests provide further evidence of the efficacy of various alkyl acrylate-acrylic acid copolymers when employed in a process for preparing microcapsules wherein the polymeric shells are produced by in situ polymerization of urea and formaldehyde.

While the above microcapsules exhibit satisfactory printing characteristics, it would be desirable to provide such microcapsules wherein the quantity of such microcapsules used, to produce a given print intensity, is reduced. The above single layer microcapsules are representative of microcapsules which can be used as starting material for making the novel 2-layer microcapsules of this invention.

This invention provides novel microcapsules, methods of making such microcapsules, and methods for improving microcapsule efficiency in paper stock. The invention further provides pressure sensitive copying material having reduced loading of microcapsules in the paper stock, while providing equivalent or improved marking intensity and clarity of image definition upon rupture of such microcapsules containing marking fluid.

Dual-shell microcapsules of the invention can be made according to the following example wherein all percents are percent by weight.

EXAMPLE 58

Starting with single layer aminoplast microcapsules produced according to a selected one of Examples 1–57, and starting with the mixture in the liquid medium in which such microcapsules were produced, the pH of the mixture is adjusted to 6–7 with 20 percent NaOH. The mixture is then diluted to a target percent solids of 23 percent aminoplast microcapsules.

A 7.25 percent solution of gelatin is prepared by adding dry gelatin powder to an adequate amount of water to meet the target percent solids of gelatin, then heating the solution to 55° C. in a water bath while stirring. A mass of 218.5 g (grams) of the 7.25 percent gelatin solution, containing e.g. 16.4 grams of gelatin solids, is added to 1012 g of a mixture of 23 percent microcapsules, e.g. 304 grams of microcapsules, in a 55° C. water bath. Thus, the gelatin represented approximately 5 weight percent of the combination of gelatin plus microcapsules.

The 55° C. mixture is then adjusted to a of pH 8.9 to 9.0 with 20 percent NaOH. Under vigorous agitation, 14.7% acetic acid is added until the pH is 4.5, which causes the gelatin to deposit as an outer shell on the existing shell of the aminoplast microcapsules such that the pre-existing aminoplast shell becomes an inner shell. The 55° C. water bath is then quickly cooled to 1–2 degrees C. to set the gelatin shell. Once the mixture is below 11.1 degrees C., 7.8 g of 25 percent glutaraldehyde is added dropwise to cross-link the gelatin. After thirty minutes of stirring, 11.8 g of 4.5 percent PVMMA (polyvinyl methyl ether-maleic anhydride copolymer) is added over the course of 15 minutes to control agglomeration of the gelatin-coated microcapsules. One hour after start of the PVMMA addition, 3.5 g of 20 percent sodium carbonate is added. Then 20 percent NaOH is added until the pH is about 10. After 1–12 hours, 0.8 g of 37 percent formaldehyde is added as preservative. The mixture is then left to agitate for an additional 24 hours, after which the mixture is warmed to room temperature.

Figure 1:
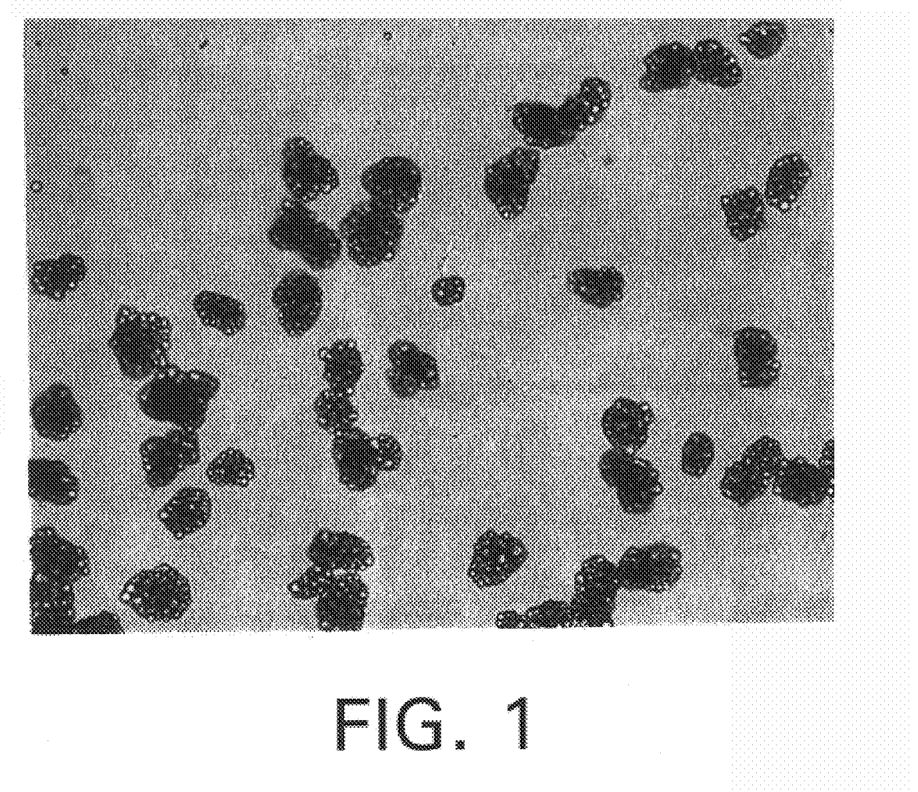
FIG. 1 is a photomicrograph of microcapsule aggregates of the present invention.

As illustrated in FIG. 1, under a microscope, the resulting aggregate particles appear very similar to a standard batch of gelatin/gum arabic aggregate particles, except for being somewhat larger at 27.3 $\mu$m (microns) volume weighted median effective diameter compared to 11.5 $\mu$m volume weighted median effective diameter for standard gelatin/gum arabic particles as measured by an AccuSizer particle size measurement instrument available from Particle Sizing Systems, Inc. Santa Barbara, Calif. The capsules were agglomerated into tight aggregate particles, somewhat resembling clusters of grapes wherein the respective capsules are aggregated in 3-dimensional clusters. The aggregate particles can have sizes from the size of conventional single-wall gelatin/gum arabic particles, namely about 11 microns, up to about 50 microns. Preferred aggregate particle size is about 20 microns to about 35 microns.

Figure 2:
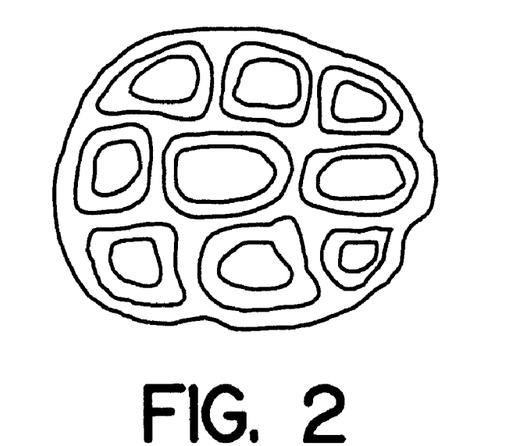
FIG. 2 is a representative cross-section of an aggregate particle of the invention, wherein outer shell material is generally distributed between the respective microcapsules such that each microcapsule has a generally continuous outer shell of the outer shell material as well as the outer shell material forming an outer shell about the aggregate.
Figure 3:
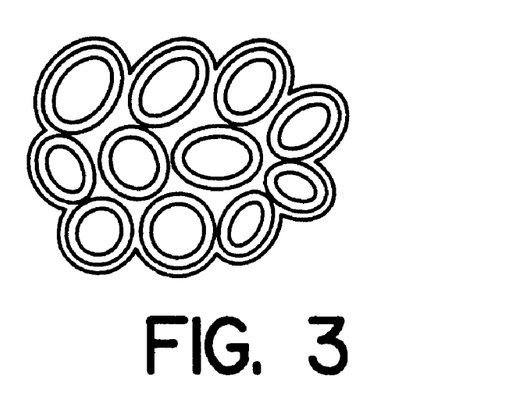
FIG. 3 is a representative cross-section of an aggregate particle of the invention wherein the outer shell material forms a skin about an agglomeration of microcapsules wherein thickness of outer shell material between individual ones of the microcapsules at the interface with the inner shell material between respective ones of the microcapsules is less than the thickness of outer shell material about an outer surface of the aggregate.

FIGS. 2 and 3 are representative of the aggregate particles so made. As seen in FIG. 2, a respective aggregate particle is comprised of a plurality of individual microcapsules, collectively joined together to form the aggregate particle. Each such microcapsule in the aggregate particle includes an inner chamber containing liquid nucleus material and an inner shell, of the aminoplast type, surrounding the nucleus material.

A thin outer shell of gelatin is overcoated over each aminoplast-type shell. In the aggregate particles, and as seen in FIG. 2, the outer shell material also serves as an outer coating providing the outer surface of the respective aggregate particle wherein the outer shell coating of the aggregate particle generally corresponds with portions of the outer shells of the microcapsules which reside at the outer surface of the aggregate particle. In the embodiments illustrated in FIG. 2, the thickness of outer shell material on the outer surface of the aggregate particle is the same as, or similar to, the thickness of the outer shell material between representative ones of the aminoplast capsules in the aggregate particle.

The microcapsules made according to the above EXAMPLE, when coated onto pressure sensitive sheet material can be utilized in relatively lesser amounts, including up to at least fifteen percent less, than amounts of otherwise comparable single-nucleus aminoplast capsules which do not have the outer e.g. gelatin shell, while retaining equivalent or improved characteristics of printing intensity and sharpness of image. By contrast, the quantity of gelatin used to develop such fifteen percent savings represents only about 5 percent of the weight of the microcapsules.

By adjusting the quantity of the agent used to control agglomeration, e.g. PVMMA, the size, and character of the aggregate can be manipulated. More PVMMA results in less agglomeration and thus smaller aggregate particles. Less PVMMA results in more agglomeration and thus larger aggregate particles. For example, FIG. 3 shows an aggregate particle wherein the preponderance of the outer shell material (e.g. gelatin) is deployed at and adjacent the exterior surface of the aggregate particle. The thickness of the gelatin between particles is highly variable, being very thin at loci of closest approach of the generally spherical aminoplast microcapsules, and thicker away from such loci of closest approach, thereby to fill the spaces defined thereat between and among the respective microcapsules which make up a respective aggregate particle.

In any embodiment of the invention, the family of agglomerated particles includes a range of sizes of agglomerates representing a range of numbers of nuclei in the respective agglomerates. In an extreme example, the family of agglomerated particles can include a substantial number of the particles which exist as single-cell, single-nucleus, microcapsules each having a single droplet of nucleus material, a single inner shell surrounding the nucleus material, and an outer shell surrounding the single inner shell. However, even in such extreme example, the majority of particles are agglomerates of multiple nuclei representing multiple droplets of nucleus material.

In an alternate method of the invention, the outer shell material is added to the coacervation mixture of nucleus material and inner shell material prior to or concurrent with completion of formation of the inner shell about the droplets of nucleus material. Accordingly, deposition of the outer shell material and the inner shell material can somewhat overlap. First, deposition of the inner shell material on the nucleus material is initiated. When deposition of the inner shell material has progressed sufficiently with coating the droplets of nucleus material, the outer shell material is added to the mixture under suitable conditions whereupon the outer shell material begins depositing on the inner shell material. As the outer shell material deposits on the inner shell material at the respective developing particles, the deposited outer shell material becomes the surface onto which material in the liquid mixture can be deposited. Namely, the outer surface of the inner shell is covered by outer shell material and thus is no longer available as a deposition site. But in this method, at least residual quantities, typically active quantities, of both the inner and outer shell materials are simultaneously available in the liquid mixture while the outer shell material is being deposited.

In this method, the inner and outer shell materials are selected such that the surface tension of the respective inner and outer shell materials, in the liquid mixture, are such that the outer shell material can deposit on the inner shell material but the inner shell material does not readily deposit on the outer shell material. As the outer shell material begins to coat the inner shell material on the respective developing particles, the deposited outer shell material becomes the deposition surface. To the extent the deposition surface is defined by outer shell material, the inner shell material in the liquid mixture is prevented from forming further deposits on a respective developing particle. Thus, timing of addition of the outer shell material to the coacervation mixture can be used as desired to control attenuating the deposition of the inner shell material, thus as part of the control of the quantity of inner shell material deposited about the droplets of nucleus material.

To that end, once the mixture containing the inner shell material and nucleus material has been adjusted to pH 5.0 and heated to 55 degrees C., and the continuous stirring is in progress, the outer shell material mixture can be added to the liquid mixture, along with diluting water. The pH is adjusted to at least pH 6, preferably pH 7, whereupon, with continued stirring, the outer shell material deposits on the inner shell material.

A substantial benefit of the invention is the tendency of the microcapsules to agglomerate together to form aggregates. The sizes of the respective capsules can be influenced by multiple factors. First, the more vigorous the stirring, the greater the mechanical shear energy imparted to the liquid mixture, the smaller the sizes of the particles/droplets of nucleus material in the mixture. In addition, vigorous stirring and shearing tends to retard or inhibit development of larger size aggregates in the mixture. Thus, the mechanical stirring and shear action are factors both in sizes of the individual microcapsules and in the number of microcapsules which agglomerate together to form respective aggregate particles.

In addition, the sizes of the agglomerates is chemically influenced by the use of the PVMMA in the mixture as an anti-agglomeration agent, namely as an agent to control the tendency of the outer shell material to agglomerate, thereby to form the aggregate particles. Adding the PVMMA to the mixture, in combination with vigorous stirring, prevents the e.g. gelatin from setting up in a small number of grossly larger aggregate particles. The greater the amount of PVMMA used, along with the vigorous stirring with good shear action, the fewer the number of aminoplast capsules which collect into respective individual aggregate particles. Accordingly, by controlling stirring, liquid shear, and anti-agglomerant addition, one can exercise substantial control over sizes of the particles produced, such that the particles tend to coat onto the surface of the paper rather than become embedded in the paper.

The quantity of material used in forming the outer shell of gelatin has been illustrated at about 5 percent of the weight of the aggregate, assuming nominal quantity of gelatin left undeposited in the process mixture at completion of the process. The reason for adding the gelatin outer shell material is to cause aggregate formation. Such aggregate formation is a function of the surface properties of the microcapsule, so only skin effect is needed. Such skin affect can be achieved with as little as about 2 percent by weight gelatin. While a substantial fraction of the microcapsule can be gelatin, such as 20 percent or 30 percent, such additional material adds to the overall cost of delivering the nucleus material to the desired location without necessarily providing a corresponding benefit. In addition, such additional material increases the structural strength of the capsules whereby breaking the capsules for release of the nucleus material becomes increasingly more difficult with increase in quantity of the outer shell material.

Accordingly, in the invention, an upper limit on the amount of outer shell material is about 15 percent of the dry weight of the microcapsules. A preferred range is about 2 percent to about 10 percent, with a more preferred range of about 3 percent to about 8 percent, and a most preferred range of about 4 percent to about 7 percent.

When referring to capsules or aggregates, the phrase "dry weight" includes the liquid nucleus material.

As used herein, "loading" of paper stock e.g. with microcapsules includes loading of such microcapsules on the surface of such paper stock as well as paper stock wherein the microcapsules are fully or partially embedded in the paper stock, or are fully or partially embedded inside the structure of the paper such that the microcapsules generally lose definition as e.g. part of a coating and rather become coupled with the paper stock as part of the paper stock. Thus, a loading can reside generally on the surface of the paper stock, can be partially embedded into the surface of the paper stock, or can be received generally into and at or below the surface of the paper stock.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A population of pressure sensitive microcapsule aggregate particles, respective said aggregate particles in said population comprising:
   (a) a plurality of inner shells polymerized from polar pre-polymer materials, said inner shells extending about, and defining, closed central chambers, said inner shells being disposed in close proximity to each other in a given aggregate particle in an arrangement of said inner shells;
   (b) each of said closed central chambers containing liquid chromogenic composition; and
   (c) outer shell material defining an outer shell collectively enveloping said plurality of inner shells in a given said aggregate particle and thereby collectively joining said inner shells together as said aggregate particle.

2. A population of pressure sensitive microcapsule aggregate particles as in claim 1 wherein said outer shell material is selected from the group consisting of gelatin, gelatin derivatives, and other complex colloids which form said outer shell.

3. A population of pressure sensitive microcapsule aggregate particles as in claim 1 wherein said outer shell material surrounds substantially the entirety of each said inner shell.

4. A population of pressure sensitive microcapsule aggregate particles as in claim 1 wherein said outer shell material comprises cross-linked gelatin.

5. A population of pressure sensitive microcapsule aggregate particles as in claim 2 wherein said inner shell material comprises an aldehyde derivative, and wherein said outer shell material comprises at least one of gelatin and gum arabic.

6. A population of pressure sensitive microcapsule aggregate particles as in claim 2 wherein said aggregate particles has effective diameters of about 20 microns to about 35 microns.

7. A population of pressure sensitive microcapsule aggregate particles as in claim 5 wherein said aggregate particles have average effective diameters of about 20 microns to about 35 microns.

8. A population of pressure sensitive microcapsule aggregate particles as in claim 2 wherein said outer shell material comprises about 2 weight percent to about 10 weight percent of the composition of said aggregate particles.

9. A population of pressure sensitive microcapsule aggregate particles as in claim 5 wherein said outer shell material comprises about 3 weight percent to about 8 weight percent of the composition of said aggregate particles.

10. A population of pressure sensitive microcapsule aggregate particles as in claim 6 wherein said outer shell material comprises about 3 weight percent to about 8 weight percent of the composition of said aggregate particles.

11. A pressure sensitive copying material, comprising:
   (a) a substrate fibrous sheet material for receiving a coating of marking material; and
   (b) a marking material coated on and affixed to said substrate fibrous sheet material, said marking material comprising pressure-sensitive microcapsule aggregate particles, each said aggregate particle containing liquid chromogenic composition enclosed in a plurality of inner shells polymerized from polar pre-polymer materials, each said inner shell extending about and enclosing a droplet of said liquid chromogenic composition, said inner shells being disposed in close proximity to each other in an array of said inner shells, an outer shell collectively encompassing said inner shells thus to define an outer surface of the respective said aggregate particle.

12. A pressure sensitive copying material as in claim 11 wherein said outer shell material is selected from the group consisting of gelatin, gelatin derivatives, and other complex colloids which form said outer shell.

13. A pressure sensitive copying material as in claim 11 wherein said outer shell material surrounds substantially the entirety of each said inner shell.

14. A pressure sensitive copying material as in claim 11 wherein said outer shell material comprises cross-linked gelatin.

15. A pressure sensitive copying material as in claim 12 wherein said inner shell material comprises an aldehyde derivative and wherein said outer shell material comprises at least one of gelatin and gum arabic.

16. A pressure sensitive copying material as in claim 12 wherein said aggregate particles has effective diameters of about 20 microns to about 35 microns.

17. A pressure sensitive copying material as in claim 12 wherein said outer shell material comprises about 2 weight percent to about 10 weight percent of the composition of said aggregate particles.

18. A pressure sensitive copying material as in claim 15 wherein said outer shell material comprises about 3 weight percent to about 8 weight percent of the composition of said aggregate particles.

19. A method of making aggregate particles containing droplets of chromogenic material wherein a respective aggregate particle comprises multiple droplets of such chromogenic material, each contained in a microcapsule defined by an inner shell, an outer shell encompassing the entirety of the aggregate particle and thereby collectively containing the enclosed inner shells and droplets, the method comprising:

(a) forming the microcapsules from polar pre-polymer materials, in an aqueous processing mixture, each microcapsule comprising an inner shell and a droplet of chromogenic material contained therein;

(b) after formation of the inner shell, adding an outer shell material comprising gelatin to the reaction mixture and thereby agglomerating the inner shells into aggregate particles wherein gelatin forms an outer shell coating encompassing each respective aggregate particle.

20. A method as in claim 19, including adding the gelatin in a quantity of about 2 weight percent to about 10 weight percent of the quantity of the gelatin, the inner shells, and the droplets of chromogenic material.

21. A method as in claim 19, including forming the inner shells using a composition rich in aldehyde.

22. A method as in claim 19, including mixing the mixture and treating the mixture with an agglomeration control agent to obtain aggregates having average effective diameters of about 20 microns to about 35 microns.

23. A method of making aggregate particles containing droplets of chromogenic material wherein a respective aggregate particle comprises multiple droplets of such chromogenic material, each contained in a microcapsule defined by an inner shell, an outer shell encompassing the entirety of the aggregate particle and thereby collectively containing the enclosed inner shells and droplets, the method comprising:

(a) initiating formation of the microcapsules from polar pre-polymer material, in an aqueous processing mixture by developing inner shells about droplets of the chromogenic material; and (b) after initiating formation of the microcapsules, and before reaching an end point of such development of the microcapsules, adding to the aqueous mixture an outer shell material which deposits on the inner shells thus attenuating deposition of inner shell material from the liquid mixture onto the developing inner shells, and wherein the outer shell material agglomerates the developing microcapsules together and forms aggregate particles thereof and forms an outer shell coating encompassing each respective aggregate particle.

24. A method as in claim 23, including adding the gelatin in a quantity of about 2 weight percent to about 10 weight percent of the quantity of the gelatin, the inner shells, and the droplets of chromogenic material.

25. A method as in claim 23, including forming the inner shells using a composition rich in aldehyde.

26. A method as in claim 23, including mixing the mixture and treating the mixture with an agglomeration control agent to obtain aggregates having average effective diameters of about 20 microns to about 35 microns.

* * * * *